Patented Aug. 19, 1930

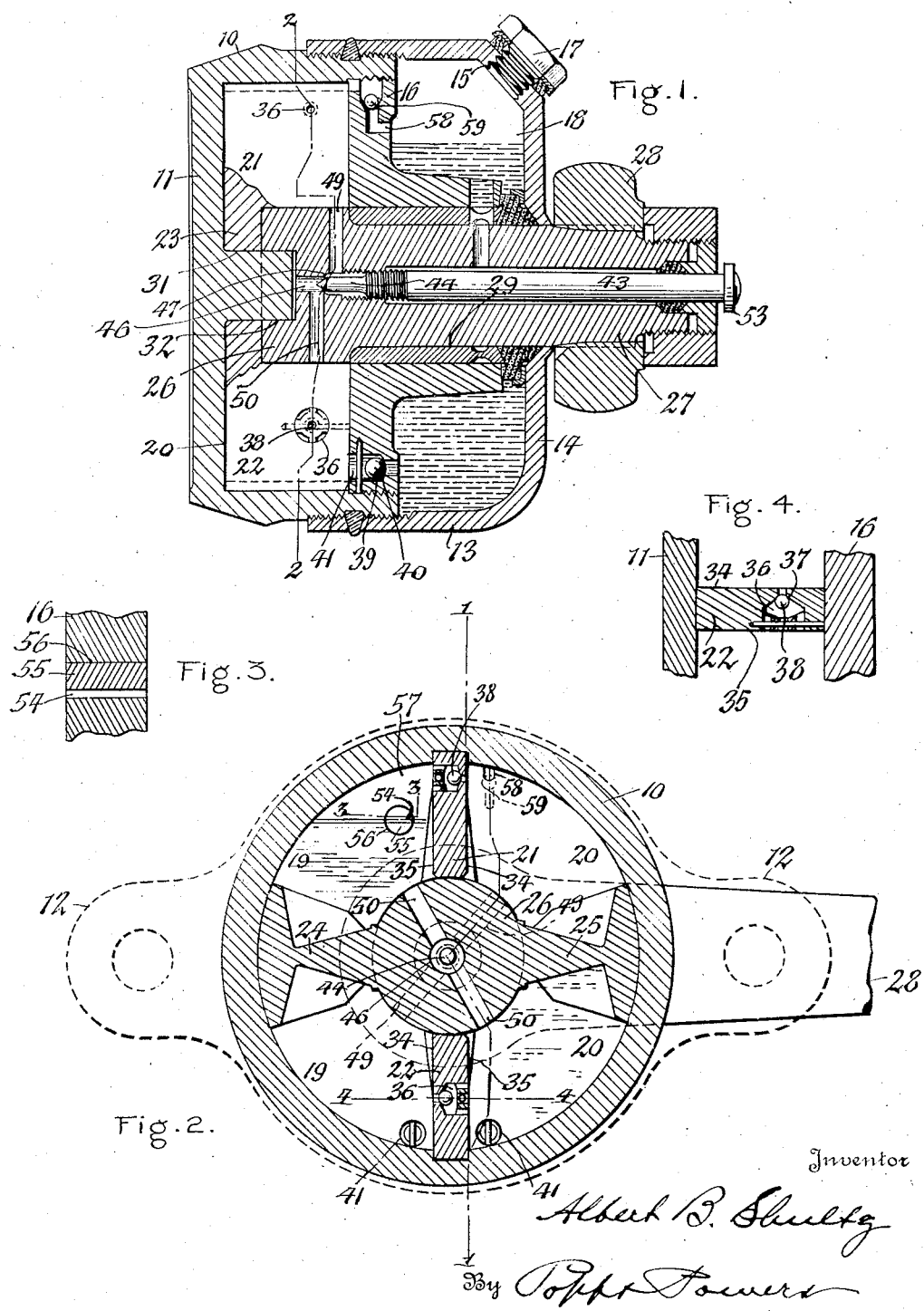

1,773,282

UNITED STATES PATENT OFFICE

ALBERT B. SHULTZ, OF BUFFALO, NEW YORK, ASSIGNOR TO HOUDE ENGINEERING CORPORATION, OF BUFFALO, NEW YORK, A CORPORATION OF NEW YORK

SHOCK ABSORBER

Application filed February 24, 1927. Serial No. 170,628.

This invention relates to a shock absorber in which both liquid and air are employed as the resistant for producing the shock absorbing effect.

In shock absorbing of this type, as heretofore constructed, means were provided in connection with the movable piston which permitted the latter to move with greater freedom during certain parts of its working stroke which has generally been referred to as the neutral or normal zone, but movement of the piston through other parts of its stroke was opposed by greater resistance, which lastmentioned parts may be referred to as the abnormal zone. For this reason it has been necessary to mount such shock absorbers on the running gear of automobiles with accuracy in order to synchronize the movement of the piston while traveling through the neutral zone with that position of the spring suspension of the car which it assumes while the car is traveling over comparatively even roads, and the spring and frame of the car are vibrating in a normal zone relatively to each other, but when the spring and frame move an abnormal distance relatively to each other, as occurs during a rebound, the piston will move through the abnormal zone and encounter an increased resistance which will adequately cushion the shock.

Owing to the difference in the weight and makes of cars and the variation in loads which the same carry at different times it has been impossible to set shock absorbers to work most efficient under all these changing conditions.

It is therefore the object of this invention to provide a shock absorber in which the neutral zone is not located at any particular point or defined between definite limits but instead is automatically shifted in accordance with changing conditions and practically provides what may be termed a universal neutral zone which avoids the necessity of mounting the shock absorber so as to move accurately in relation to the spring suspension of the car, thereby causing the shock absorber to work equally well under varying conditions and materially reducing the cost of installation and maintenance.

To that end this invention consists generally in providing an air pocket in the compression end of the pressure chamber in which air is trapped and compressed by the piston after the piston has passed a vent passage through which the air escapes freely during part of the compression stroke of the piston, but only a small amount of liquid can escape due to its greater density and constantly replenishing the air supply in the compression end of this chamber.

In the accompanying drawings:—

Figure 1 is a vertical longitudinal section of a shock absorber embodying my improvements taken on line 1—1 Fig. 2.

Figure 2 is a cross section taken on line 2—2 Fig. 1.

Figures 3 and 4 are fragmentary sections taken on the correspondingly numbered lines in Fig. 2.

In the following description similar characters of reference indicate like parts in the several figures of the drawings:—

This shock absorber includes a casing which is composed of a rear or pressure section and a front or storage section. The rear section preferably consists of an annular side wall 10 which is closed at its rear end by a transverse wall 11 and has ears 12 on its opposite ends whereby the same is secured by bolts or otherwise to one of the relatively movable parts between which the shock absorber is adapted to be interposed. The front or storage section of the casing consists of an annular side wall 13 which is closed at its front end by a transverse front wall 14 while its rear end is connected with the front end of the side wall of the rear casing section. The space within the casing is divided by a main transverse partition 16 which is secured at its periphery in the bore of the side wall of the rear casing section. The space within the front section of the casing forms a storage reservoir or chamber 18 in the lower part of which is stored oil or other resistant liquid such as glycerine which serves as a shock absorbing medium and provides a supply from which the pressure chambers 19, 20 of the shock absorber are replenished as required. This liquid is supplied to the storage chamber through a filling opening 15 which is normally closed by a plug 17. The upper part of the reservoir forms an air chamber or space.

The pressure chambers or compartments 19, 20 are semi-cylindrical and formed in the rear section of the casing between a diametrical vertical partition composed of two radial sections or wings 21, 22 fitted at their outer ends against the bore of the rear side wall 10 and engaging their rear ends with the rear wall 11 of the rear casing section and their front ends with the main partition 16, and connected at their inner rear corners by a central neck 23.

Arranged within the pressure chambers 19, 20 respectively are two pistons 24, 25 which oscillate therein and are connected at their inner ends by a hub 26 which is interposed between the partition neck 23 and the main partition 16 and each of said pistons engaging its outer end with the bore of the respective semi-cylindrical pressure chamber while its rear end engages with the rear wall 11 of the respective pressure chamber and its front end engages with the main partition 16.

Projecting forwardly from the hub of the pistons is a main operating shaft 27 which extends through the main partition 16, the reservoir 18 and the front wall 14 of the latter to the exterior of the casing and is provided at its outer extremity with a rock arm 28 which is adapted to be connected in any suitable manner with another member of the relatively movable parts between which the shock absorber is interposed so that the shaft and the pistons will be rocked as these parts move one toward and from the other, as would be the case, for example between the axle and the body of an automobile which are yieldingly connected by springs. The pistons and the operating shaft are journaled on the casing and maintained in axial alignment with the semi-cylindrical pressure chambers by mounting the rock shaft in a bearing 29 on the central part of the main partition 16 and a pivot pin 31 projecting forwardly from the rear wall 11 of the casing through an opening in the neck 23 and into a circular recess 32 in the rear side of the hub of the pistons.

Normally the pressure chambers are filled more or less with a pressure resisting liquid on opposite sides of the pistons and means are provided which permit the liquid to flow comparatively free from one side of the pistons to the other while the same are effecting a compression stroke in one direction but a reverse flow is either prevented or retarded when the pistons effect a non-compression stroke in the opposite direction and thereby effect a comparatively small resistance to the movement of the pistons in one direction but a considerable resistance thereto in the opposite direction for the purpose of absorbing shock, as for instance during the rebound of a car when traveling over an uneven roadway. Free flow of liquid from the non-compression side 34 of each partition wing 21, 22 to the opposite compression side 35 of the same but checking reverse flow of the liquid is accomplished in the present case by a check passage 36 arranged in each wing of the partition and extending from one side to the other thereof and provided with a valve seat 37 facing toward the high pressure side of one piston, and a ball check valve 38 arranged in said check passage and movable toward and from said valve seat 37, as shown in Figs. 1, 2 and 4.

During the forward or high compression stroke of the pistons both check valves 38 engage their seats and thus prevent the passage of any resistance liquid therethrough whereby the advance movement of the pistons is retarded. The return, low pressure, or non-compression stroke of the pistons is however attended with little resistance due to the fact that the check valves 38 during this time open automatically under liquid pressure, thereby permitting the liquid to flow freely from the non-compression end of one pressure chamber on the low pressure side of the piston therein into the compression end of the other pressure chamber on the high pressure side of the piston therein, whereby the pistons are free to move backward with comparative freedom.

As the resistance liquid in the pressure chambers is reduced by waste or leakage the supply to the pressure chambers is automatically replenished by check valves 39 adapted to engage seats 40 in replenishing passages 41 extending from the lower part of the liquid storage chamber to the lower parts of the two pressure chambers, so that when the pistons move away from these replenishing passages liquid will be drawn into the pressure chambers from the storage reservoir, but during a reverse movement of the piston the liquid will not be able to flow back into the storage chamber and instead is compelled to distribute itself in the pressure chambers during the working of the shock absorber.

Means are provided whereby the flow of resistance fluid from one side of the pistons to the other may be regulated at will so as to accurately control the movement of the pistons in accordance with the weight of the car, the character of its spring suspension or to suit other conditions. The preferred form of these means is as follows:—

Formed lengthwise of the axis of the operating shaft and the hub of the pistons is a longitudinal passage 46 having an outwardly facing valve seat 47. Said longitudinal passage communicates in front of its seat 47 with the pressure chambers on the low pressure or non-compression sides of the pistons by front branch passages 49, and in rear of said valve seat 47 the longitudinal passage communicates with the pressure chambers on the high pressure or compression sides of the pistons therein by rear branch passages 50.

Within the longitudinal bore of the operating shaft and the hub of the pistons is arranged a valve stem having a long front part 43, a screw threaded intermediate part engaging with a corresponding screw threaded part on the longitudinal passage in said bushing, and a regulating valve 44 on its inner part which is adapted to move toward and from said valve seat 47 upon turning the valve stem in one direction or the other by a handle or finger piece 53 arranged at the outer end of the valve stem which projects beyond the front end of the operating shaft. The two pressure chambers are arranged side by side and the pressure chamber 19 has its high compression end uppermost and the pressure chamber 20 has its low compression end uppermost.

Extending from the upper part of air space within the reservoir 18 to the upper high compression end of the pressure chamber 19 is an escape, outlet or passage 54 which is arranged a considerable distance below the top or upper extremity of this chamber, for example one-half inch from the top of the same. This outlet vent is preferably formed in the side of a plug 55 arranged in a horizontal opening 56 in the partition 16, whereby upon turning this plug, the vent passage therein may be raised or lowered to secure the best results under different working conditions. The space within the upper high compression end of the pressure chamber 19 above the outlet passage 54 forms a pocket 57 in which air is adapted to be trapped or confined.

During the first part of the upward movement or compression stroke of the piston 24 in the chamber 19 some of the air therein will be forced out through the vent 54 into the air space of the reservoir, the air owing to its thinness being able to pass very rapidly and thereby offer only a slight resistance to the compression stroke of the piston 24. When however the liquid has been raised in the upper high compression end of the chamber 19 by the upward compression stroke of the piston 24 therein and this liquid, owing to its greater density can only flow very slowly out through the vent passage so that the same is practically sealed and therefore cause the air to be trapped in the pocket 57 and serve to cushion the continued upward movement of the piston 24.

When the piston 24 has advanced upwardly far enough in the chamber 19 to close the vent 54 during its high compression stroke then the further escape of liquid and air through this vent is positively cut off. Thereafter the air is positively trapped or confined in the pocket 57 in the upper compression end of the chamber 19 and forms an air cushion which yieldingly resists the advance of the piston therein and causes the final part of the shock to be absorbed.

In order to replenish the air at the upper high compression end of the pressure chamber 19 an air inlet or supply vent or passage 58 is provided which extends from the air space in the upper part of the reservoir 18 to the upper or low compression end of the pressure chamber 20. This air supply passage is preferably formed in the upper part of the partition 16 and may contain a check valve 59 which only permits air to pass from the reservoir 18 in the upper or low-pressure end of the pressure chamber 20 but prevents the air from flowing in the opposite direction.

As the piston 25 in the pressure chamber 20 effects a high compression stroke, air is drawn behind this piston from the air space of the reservoir 18 into the upper part of the pressure chamber 20, and during the low or non-compression stroke of the piston 25 in the chamber 20 the air is forced from the upper part of this chamber past the upper check valve 38 in the upper partition section 21 and into the upper end of the other pressure chamber 19 preparatory to effecting the next following operation of trapping air in the pocket 57 and cushioning the high compression stroke of the pistons.

In the old type of shock absorber the air vent in the upper high compression end of one pressure chamber was arranged as high as possible in order to practically fill this end of this chamber with fluid during the high compression stroke of the piston therein. This has been found objectionable for the reason that it necessitated the employment of by-passes during the normal range of the absorber and required the absorber to be set accurately relatively to the spring suspension in order to secure only a light resistance while traveling over good roads and a heavy resistance for absorbing shock while traveling over rough roads.

It has been found that the presence of air, instead of being an objection, is really desirable inasmuch as an elastic cushion effect is obtained by the presence of air, together with the fluid on the high compression side of one of the pistons.

In the present invention, therefore, the air outlet vent 54 instead of being arranged at the very top or extremity of the high compression side of the pressure chamber 19 as was done heretofore, is now placed a considerable distance below the top of this chamber, preferably about one half inch, or near to the hub of the partition 16 in which the shaft turns. By thus locating the air outlet or vent further down, the piston 24 during a high compression stroke will cause air to be expelled from the upper end of the chamber 19 until the liquid level has been raised to a point where it covers this air vent and liquid seals the same. Thereafter the air remaining in the pressure chamber 19 above the vent 54 will be compressed by the piston 24 and owing to its elasticity will offer an elastic resistance to the compression movement of this piston, instead of a dead resistance such as is produced by the presence of fluid alone.

The maximum supply of air to the air cushion pocket 57 is provided by the separate air inlet vent 58 leading to the low or non-compression end of the pressure chamber 20 so that air will be drawn from the air space in the top of the reservoir 18, which air is then pushed into the air pocket 57 so that an abundant supply of air will be present in the latter to produce a powerful cushioning effect, during the high compression stroke of the respective piston.

In this organization it is unnecessary to mount the shock absorber so that the pistons travel in a predetermined neutral range when the spring suspension is only moderately active while traveling over comparatively even roads as has been necessary heretofore. No definite predetermined neutral range of movement of the pistons is necessary in the present construction because the piston 24 is free to vibrate through a neutral zone or normal range in its pressure chamber 19 regardless of what particular part of this chamber it may be in because the liquid and air in the pressure chamber 19 are not closely confined and therefore offer little shock absorbing resistance. But when this piston 24, due to a rebound action of the spring suspension, extends its high compression upward beyond the normal range or neutral zone, the liquid seals the opening 54 and thereby retards the escape of liquid so that the air is confined more closely in the upper high compression end of the chamber 19 and offers a greater cushioning effect to the rebound action of the spring suspension. And when the rebound of the spring suspension reaches its maximum the upward or high compression stroke of the piston 24 is opposed by the combined resistance of the liquid and the air trapped in the extreme upper end of the pocket 57 due to the positive closing of the vent passage 54 by the piston 24.

This shock absorber therefore automatically establishes the neutral zone or normal range of movement which is indeterminate and therefore universal, so that no accurate setting of the instrument is necessary for producing no substantial shock absorbing effect while running over comparatively even roads and thus permitting the spring suspension free play to secure easy riding.

Moreover in the action of this shock absorber a greater cushioning effect is obtained after passing out of the neutral zone or normal range before any considerable resistance is encountered due to heavy rebound so that the action of the absorber is graduated and adapted to the varying shocks or loads to which the same is subjected in practice and therefore renders riding more comfortable and agreeable.

I claim as my invention:—

1. A shock absorber comprising a pressure chamber, a replenishing reservoir, said chamber and reservoir communicating with each other by a liquid and air escape passage arranged at a distance below the top of the said pressure chamber and forming an air pocket in said chamber above said escape passage which is adapted to hold a substantial amount of air, and a piston moving back and forth in said pressure chamber, said chamber being adapted to contain air and a resistance liquid which air is discharged from the pressure chamber through said escape passage into said replenishing reservoir by the piston during its forward movement until the liquid has been raised to cover said escape opening, after which the liquid therein escapes through said opening at a slower rate and is pressed against the air trapped in said pocket above said escape passage during the continued forward movement of said piston.

2. A shock absorber comprising a cylinder divided by a vertical partition into two pressure chambers, a replenishing reservoir adapted to contain liquid in its lower part and air in its upper part, pistons oscillating in said pressure chambers, check valves for permitting fluid to pass from the low-compression side of each partition to the high compression side thereof during the backward stokes of the pistons in the pressure chambers, an air replenishing passage extending from the upper part of the replenishing reservoir to the upper or low-compression end of one of the pressure chambers, said pressure chambers being adapted to contain a resistance liquid, and an escape passage extending from a point below the top of the high compression end of one of the pressure chambers to the upper part of the replenishing reservoir and forming an air pocket above said escape passage adapted to hold a substantial amount of air and through which passage the air is discharged from the upper high compression end of one of said chambers into said replenishing reservoir by the forward and upward movement of the piston in the respective pressure chamber until the liquid therein has been raised to cover said escape passage after which the liquid therein escapes through said escape passage at a slower rate and is pressed against the air trapped in said pocket above said escape passage during the continued upward and forward movement of the piston therein.

3. A shock absorber comprising a cylinder divided by a vertical partition into two pressure chambers, a replenishing reservoir adapted to contain liquid in its lower part and air in its upper part, pistons oscillating in said pressure chambers, check valves arranged in said partitions and permitting fluid to pass from the low compression side of each partition to the high compression side thereof during the backward strokes of the pistons in the pressure chambers, an air replenishing passage extending from the upper part of the replenishing reservoir to the upper low-compression end of one of the pressure chambers, said pressure chambers being adapted to contain a resistance liquid, an air escape passage extending from a point below the top of the high compression end of one of the pressure chambers to the upper part of the replenishing reservoir and forming an air pocket above said air escape passage, whereby the air is discharged from the upper high compression end of one of said chambers through said escape opening into said replenishing reservoir by the forward and upward movement of the piston in the respective pressure chamber until the liquid therein has been raised to said escape passage after which part of the liquid escapes slowly through said escape passage and causes the air to be trapped in said pocket and then said piston during its continued forward movement covers said escape passage and compresses the air trapped in said pocket above said escape passage and valves in the lower part of the replenishing reservoir to permit flow of liquid to said pressure chambers.

4. A shock absorber comprising a cylinder divided by a vertical partition into two pressure chambers, a replenishing reservoir adapted to contain liquid in its lower part and air in its upper part, pistons oscillating in said pressure chambers, check valves for permitting fluid to pass from the low-compression side of each partition to the high compression side thereof during the backward strokes of the pistons in the pressure chambers, an air replenishing passage extending from the upper part of the replenishing reservoir to the upper low-compression end of one of the pressure chambers, said pressure chambers being adapted to contain a resistance liquid, and an escape passage extending from a point below the top of the high compression end of one of the pressure chambers to the upper part of the replenishing reservoir and forming an air pocket above said escape passage, whereby the air is discharged from the upper high compression end of one of said chambers through said escape passage into said replenishing reservoir by the forward and upward movement of the piston in the respective pressure chamber until the liquid therein has been raised to cover said escape passage after which the liquid therein escapes through said escape passage at a slower rate and is pressed against the air trapped in said pocket above said escape passage during the continued upward and forward movement of the piston therein, and a check valve arranged in said air replenishing passage and permitting air to pass from the replenishing reservoir to said low compression end of one pressure chamber.

5. A shock absorber comprising two pressure chambers one having an upper high compression end and the other an upper low-compression end, an air and liquid reservoir, the upper part of said reservoir being connected with the high compression end of one of said pressure chambers by an escape passage which is arranged below the top of said high compression end so as to form a pocket at the upper extremity of said high compression end, the upper part of said reservoir being also connected by a supply passage with the low compression end of the other pressure chamber, liquid supply means connecting the lower end of said reservoir with said pressure chambers, a check valved passage connecting said upper high compression and said upper low compression ends of said chambers, and pistons movable back and forth in said chambers.

6. A shock absorber comprising a pressure chamber, a reservoir, said chamber and reservoir communicating with each other by a passage arranged at a distance below the top of said pressure chamber, and forming a pocket in said chamber above said escape passage which is adapted to hold a substantial amount of air, and a piston moving in said pressure chamber, said chamber being adapted to contain air and a liquid, which air is discharged therefrom through said escape passage into said reservoir by the piston until the liquid has been raised to cover said escape opening.

In testimony whereof I hereby affix my signature.

ALBERT B. SHULTZ.